United States Patent [19]

Carlson

[11] 4,097,380

[45] Jun. 27, 1978

[54] SEPTIC TANK-LEACHING POOL ARRANGEMENT

[75] Inventor: Karl Carlson, Kings Park, N.Y.

[73] Assignee: Anthony J. Scotto, Smithtown, N.Y.

[21] Appl. No.: 679,514

[22] Filed: Apr. 22, 1976

[51] Int. Cl.² .............................................. B01D 43/00
[52] U.S. Cl. .................................... 210/170; 210/261; 210/532 S
[58] Field of Search .................. 210/170, 261, 532 S, 210/532 R; 285/24, 26; 403/13, 14

[56] References Cited

U.S. PATENT DOCUMENTS

| | | | |
|---|---|---|---|
| 1,797,697 | 3/1931 | Rymal | 210/532 S |
| 2,367,270 | 1/1945 | Evans et al. | 210/532 S |
| 2,781,311 | 2/1957 | Brundage | 210/532 S |
| 2,796,176 | 6/1957 | Monson | 210/261 |
| 3,031,083 | 4/1962 | Schreiber | 210/532 S |
| 3,240,343 | 3/1966 | Werner | 210/532 S |
| 3,628,812 | 12/1971 | Larralde et al. | 285/24 |
| 3,630,370 | 12/1971 | Quina | 210/170 |
| 3,784,012 | 1/1974 | Carlson | 210/532 S |
| 3,898,162 | 8/1975 | Carlson et al. | 210/532 S |

*Primary Examiner*—William A. Cuchlinski, Jr.
*Assistant Examiner*—David L. Lacey
*Attorney, Agent, or Firm*—Posnack, Roberts, Cohen & Spiecens

[57] ABSTRACT

A septic tank for use with a leaching pool is provided which has a cylindrical portion forming a chamber for treatment of raw sewage. A ring encircles the cylindrical portion for mounting the septic tank on the upper wall edge of the leaching pool. Positioning haunches or centering elements are also provided which automatically center the septic tank on the leaching pool. An inlet baffle and an outlet baffle are also provided in the septic tank with each having an open top for alignment with a viewing opening formed in a cover provided for the septic tank. The outlet baffle leads into a passageway formed by a reinforcing member extending downwardly from the upper portion of the cylindrical portion. The cylindrical member, the ring, the positioning haunches, and the reinforcing member are all monolithically formed of precast concrete.

7 Claims, 5 Drawing Figures

SEPTIC TANK-LEACHING POOL ARRANGEMENT

FIELD OF THE INVENTION

The present invention relates to septic tanks for treatment of raw sewage effluent for home and industrial use and, more particularly, to septic tanks of a type which direct liquid sewage to a leaching structure therebelow for subsequent seepage into the surrounding earth.

BACKGROUND OF THE INVENTION

Septic tanks for the treatment of raw sewage are well-known. For example, in U.S. Pat. Nos. 3,240,343; 3,784,012; 3,817,864; 3,826,376; and 3,898,162 there are disclosed septic tanks and leaching pool structures wherein raw sewage is fed to the inlet of the septic tank, is treated in the septic tank, and is fed through the outlet of the septic tank to the associated leaching pool for seepage into the surrounding earth. However, all of these prior art structures suffer from the disadvantages of being costly to produce, difficult to install, and prone to clogging of either the inlet opening or the outlet opening without a simple remedial action being available to unclog the openings.

There are other known types of sewage treatment systems. For example, in U.S. Pat. Nos. 2,069,058 and 3,057,796, there are disclosed septic tank structures which are directly mounted in the surrounding earth whereby seepage of the treated sewage takes place directly from the septic tank. These structures, however, suffer from the same disadvantages as those described above.

Other raw sewage treatment structures are disclosed in U.S. Pat. Nos. 3,097,166; 3,118,835; 3,501,007; and 3,579,995.

SUMMARY OF THE INVENTION

It is a primary object of the present invention to provide an improved septic tank for use with a leaching pool of conventional design that is simple to manufacture, less costly to produce than the prior art septic tanks, easier and less costly to install at a home or industrial site, and effective in treating raw sewage.

It is another object of the invention to provide improved septic tank — leaching pool combinations.

The septic tank of the invention is provided with a cylindrical portion made of precast concrete which has thereabout a support ring for mounting the septic tank on the upper wall edge of a leaching pool. The cylindrical portion defines a chamber for the storage of the raw sewage and in which the raw sewage is acted upon in a conventional anaerobic reaction, and which has an inlet baffle, and an outlet baffle positioned diametrically opposite to the inlet baffle to allow for the maximum flow path between them. Each of the baffles has an open top end to allow for the viewing of the interior thereof when corresponding viewing openings formed in a cover provided for the septic tank are uncovered. The cover is also provided with a central manhole and cover therefor so that the chamber can be inspected and viewed and so that the interior of the leaching pool may be inspected via an alignment of the manhole with an opening provided in the base of the cylindrical portion, this latter opening being covered by a cover means having a caulking compound therein to prevent the flow of liquid therethrough.

There is also provided a plurality of equally spaced positioning haunches or centering elements which connect the circumference of the cylindrical portion with the horizontal bottom surface of the support ring. The positioning haunches serve to center the support ring automatically on the upper wall edge of the leaching pool.

The septic tank of the present invention when combined with a conventional leaching pool offers an easier and less costly method of installation compared with prior art arrangements. Only one hole need be dug at the installation site, as compared to the two or more holes needed in the prior art since the septic tank and leaching pool can be installed as a single unit. Further, since the cylindrical portion, the leaching ring, and the positioning haunches are formed monolithically of precast concrete, the septic tank of the invention is stronger and much less costly to produce than those of the prior art.

Viewed in another sense, the invention provides an apparatus comprising a cistern having a transverse cross-section with a septic tank superposed on this cistern and being of a smaller cross-section than the cistern. The septic tank extends downwardly into the cistern and defines an annular space therewith. A support extends outwardly on the septic tank and limits penetration of the septic tank into the cistern. The septic tank and support have respective outlet openings for the flow of liquid from the tank into the cistern. A hood is provided on the exterior of the septic tank confining a passageway between the aforesaid openings for the flow of said liquid.

In addition, the septic tank is, as has been noted hereinabove, provided with an inlet opening and there are provided baffles hanging respectively from the inlet opening and the outlet opening in the septic tank. The baffles limit accesss relative to the inlet and outlet openings and define passages axially or vertically aligned in the septic tank.

In accordance with the aforementioned features of the invention, this latter arrangement is such that the annular ring constituting the support and the septic tank and hood are a monolithic structure of concrete. Centering means are provided on the ring to center the septic tank on the cistern.

BRIEF DESCRIPTION OF THE DRAWING

The invention will be more readily understood with reference to the following detailed description, when taken in conjunction with the accompanying drawing wherein.

DETAILED DESCRIPTION OF THE INVENTION

Figure 1:
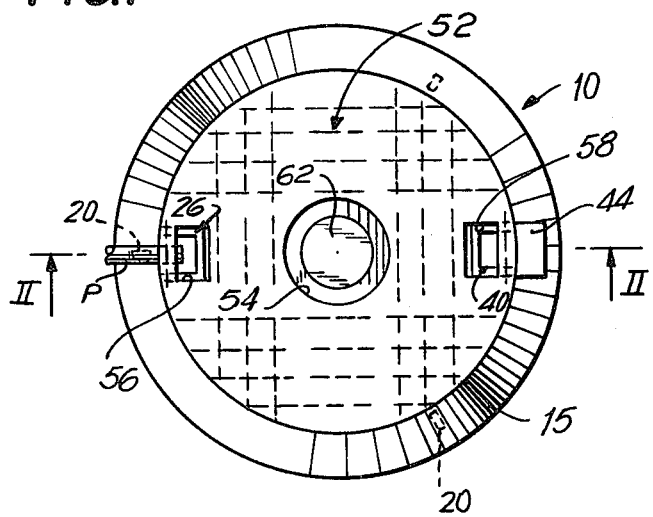
FIG. 1 is a plan view showing the septic tank of the invention positioned on a conventional leaching pool and provided with a cam.
Figure 2:
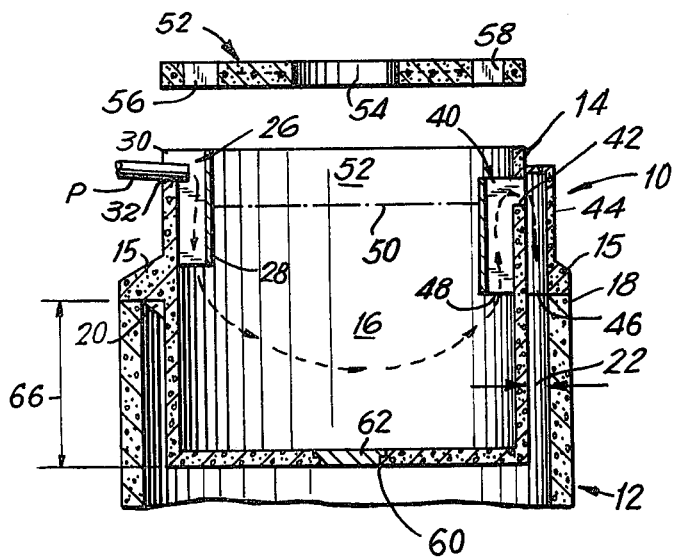
FIG. 2 is a cross-sectional view taken along line II—II of FIG. 1 showing the structure of the septic tank of the invention with the leaching pool being indicated in dotted lines.

Referring next to the drawing, there is shown in FIGS. 1 and 2 the combination septic tank and leaching pool of the invention. The septic tank of the invention is generally indicated by reference numeral 10 and the leaching pool by reference numeral 12. The septic tank 10 receives therein raw sewage from a home or industrial complex. After the raw sewage remains therein in order to be converted to liquid by anaerobic action, the liquid exits from the septic tank to the leaching pool from which liquid escapes into the surrounding earth as, for example, by seepage.

The septic tank 10 includes a monolithically formed precast concrete cylindrical portion 14 which has a chamber 16 for the storage therein of raw sewage. The cylindrical portion 14 is, for example, 6 feet in inner diameter and 6 feet, 5 inches in outer diameter, leaving a wall thickness of approximately 2½ inches.

Concentric about a portion of the outer wall of the cylindrical member 14 is a continuous support ring 15 which enables the mounting of the septic tank 10 on the upper wall edge portion 18 of the leaching pool 12. The circular support ring 15 has three positioning haunches or centering elements 20 spaced equally about the circumference of the cylindrical member or, in other words, they are 120° apart. The positioning haunches are triangularly shaped elements which serve to center the support ring on the leaching pool 12. The radial extent of each of the positioning haunches is approximately equal to the distance from the outer wall of the cylindrical portion 14 to the inner wall of the leaching pool, as indicated by the dimension 22 which also indicates the annular space between the septic tank and leaching pool. Each of the positioning haunches 20 has a canted lower surface extending downwardly from the bottom of the support ring to the outer wall of the cylindrical portion 14 so that only the horizontal bottom portion of the support ring can rest on the upper wall edge portion 18 of the leaching pool. The centering of the support ring 15 on the upper wall edge portion 14 by the positioning haunches serves to prevent eccentric positioning of the septic tank on the leaching pool.

Typically, the support ring 15 is of tapered configuration in order to add strength. It preferably has internal reinforcing rings (not shown). The ring 15 is, for example, 9½ inches in width as measured from the outer wall of the cylindrical portion 14 to the outer circumference of the ring. The entire cylindrical portion 14, the support ring 15, the positioning haunches 20, and an outlet reinforcement (to be described below) are formed monolithically of precast concrete.

Figure 3:
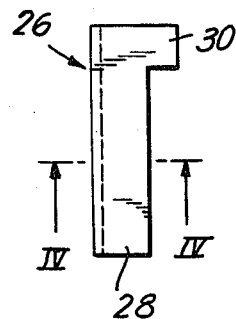
FIG. 3 is an enlarged view of the baffle used for forming the inlet and the outlet of the septic tank of the invention.
Figure 4:
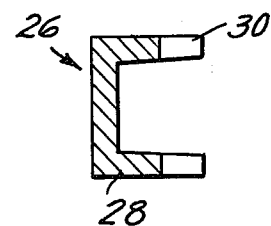
FIG. 4 is a cross-sectional view taken along line IV—IV of FIG. 3.

Mounted in an opening in the upper part of the cylindrical portion 14 is an inlet baffle 26 which is best seen in FIGS. 3 and 4. It can be fixed in position by cement. The baffle 26 has an inverted L-shaped configuration with a main portion 28 and a wall-engaging portion 30. The baffle has a U-shaped cross-section as seen in FIG. 4 so that the raw sewage entering via pipe P extending into the portion 30 can flow through the baffle and enter into the chamber 16. The portion 30 is cemented in an opening formed in the upper portion of the cylindrical portion, as at 32 in FIG. 2. The inlet baffle 26 directs the raw sewage received via inlet pipe P axially or vertically downwards along the inner wall of the chamber 16 so that turbulence is minimized.

Positioned diametrically opposite the inlet baffle 26 is an outlet baffle 40 having the same configuration as the inlet baffle 26. The outlet baffle 40 is positioned somewhat below the upper edge of the cylindrical portion 14 in an opening provided for baffle 40. It has a portion corresponding to the portion 30 of the baffle 26 and this corresponding portion is received in an opening 42 formed in the wall of the cylindrical portion 14.

The outlet baffle 40 leads to a reinforcing protector element 44 which is generally hood-shaped and is formed monolithically with the precast concrete cylindrical portion 14 and the support ring 15. The protector element 44 forms, along with a corresponding opening in the support ring 15, a continuation 46 of the passage 48 of the outlet baffle 40 through which the treated sewage is discharged via annular space 22 into the leaching pool.

The opening 42 for mounting the outlet baffle 40 is positioned below inlet 32 and below the upper edge of the cylindrical portion 14 so that the treated sewage will start to flow out of the chamber 16 upon reaching the level indicated at 50. This liquid level 50 provides a space 52 which allows for the accommodation of gases contained in the raw sewage entering via the inlet baffle 26.

The upper edge of the cylindrical portion 14 is closed off by a concrete cover slab 52 of circular shape. The cover slab 52, made of concrete, has a central circular opening or manhole 54 which is obturated by a cover. The manhole allows for entry into the chamber 16 and for the viewing of the inside of the chamber 16 for purposes of inspection. The cover slab 52 also has a pair of diametrically opposed rectangular inspection openings 56 and 58 which are positioned directly above the inlet baffle 26 and the outlet baffle 40, respectively. Since the inlet and outlet baffles are open at their top ends (as can be seen in FIG. 4) an inspector can look down through the openings 56 and 58 whereby an inspection of the inlets and outlets of the septic tank may be carried out. The openings 56 and 58 are also closed off by covers when viewing of the inlet and outlet of the septic tank is not needed. The cover 52 is preferably reinforced with a plurality of bars cast in the concrete. The base of the cylindrical portion 14 is also provided with an opening 60 obturated by a member 62 shaped as a key. The opening 60 allows access to the interior of the leaching pool 12 for inspection purposes and the like. The cover member 62 is secured with a caulking compound to prevent the flow of water therethrough.

In a preferred embodiment of the invention, the outer diameter of the cylindrical portion 14 and the concrete slab cover 52 is, for example, 6 feet, 5 inches. The height of the cylindrical portion from the base to the upper edge thereof is preferably 5 feet, 6 inches, with the bottom horizontal edge of the support ring 15 being positioned approximately 2 feet, 11 inches above the base of the cylindrical portion 14 as indicated by dimension 66. The manhole 54 is preferably 24 inches in diameter, while each of the openings 56 and 58 is of rectangular shape with dimensions of 6 inches by 12 inches. The concrete slab cover typically has a thickness of approximately 5 inches.

The leaching pool 12 preferably has an outer diameter of 8 feet, with a depth of approximately 12 feet. With the above described dimension, the capacity of the chamber 16 for storing sewage therein to be treated by anaerobic reaction is approximately 900 gallons. It is, of course, to be understood that the dimensions above described are only for illustrative purposes and may be changed to suit the particular use for which the septic tank is intended. For industrial use, the tank may be designed so as to have a larger capacity.

The septic tank and leaching pool combination of the invention has the advantage of requiring only one hole for installation. A suitably sized hole is formed in the ground, with the leaching pool 12 and the septic tank 10 being thereafter inserted together as a unit or sequentially. The leaching pool 12 may be one well-known in the art, such as disclosed in U.S. Pat. No. 3,784,012.

From what has been stated hereinabove, it will now be obvious that the invention provides an apparatus comprising a leaching pool or cistern having a transverse cross-section with a septic tank superposed on the cistern and being of a smaller cross-section than the cistern. The septic tank extends downwardly into the cistern and defines an annular space therewith. A support extends outwardly on the septic tank and limits penetration of the septic tank into the cistern. The septic tank and support have respective openings for the flow of liquid from the tank into the cistern. A hood is provided on the septic tank confining a passageway between the openings for the flow of liquid.

Figure 5:
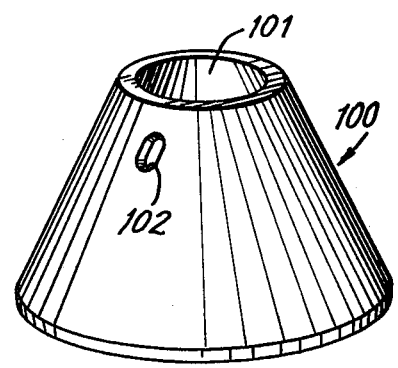
FIG. 5 is a perspective view showing a frusto-conical cover that may be used in place of the concrete slab shown in FIG. 1.

In FIG. 5, there is shown a frusto-conical cover 100 which may be used in lieu of the concrete cover slab 52. The frusto-conical cover 100 has a central manhole 101 and a pair of spaced viewing openings 102 (only one being shown in the drawing) similar in purpose to the openings 56 and 58. The cover 100 offers the advantage of increasing the height of the septic tank so as to allow for the deeper location of the tank in the surrounding earth.

The support ring 15 may be positioned relative to the base of the cylindrical portion 14 so as to position the septic tank 10 at a certain height above the upper wall edge of the leaching pool 12, thereby to adjust the amount of liquid that may be stored in the leaching pool for seepage to the surrounding earth. Further, the level of the baffle outlet may be adjusted so that the liquid level 50 is higher or lower than that indicated.

While specific embodiments of the invention have been shown and described, it is to be understood that numerous changes and modifications may be made without departing from the scope and spirit of the invention.

What is claimed is:

1. A septic tank for use with a leaching pool having an upper wall edge, said septic tank comprising: a cylindrical portion of precast concrete, said cylindrical portion defining therein a chamber for the storage and treatment of raw sewage and having an upper edge wherein are provided inlet and outlet openings in substantially diametrally opposed relation; a support ring on and positioned concentrically about said cylindrical portion for mounting said septic tank on the upper wall edge of the leaching pool and such that an annular space is formed between the septic tank and leaching pool; an inlet baffle supported on said cylindrical portion internally thereof at said inlet opening and having an open top end and an open bottom end and a vertical channel therethrough for the passage of raw sewage from said inlet opening into said chamber, said inlet baffle opening at said top end through said inlet opening for the receipt of raw sewage; an outlet baffle supported on said cylindrical portion internally thereof at said outlet opening and a vertical channel therethrough for directing treated liquid sewage from said chamber via said outlet opening to the leaching pool, said outlet baffle opening laterally through said outlet opening for the discharge of sewage from the septic tank to the leaching pool via said annular space and a cover on said cylindrical portion for obturating the said cylindrical portion, said cover having a pair of viewing openings formed therein in vertical alignment with said open top ends of said inlet baffle and said outlet baffle whereby inspection of the channels of the baffles may be carried out; said septic tank further comprising a plurality of positioning haunches spaced about the circumference of said cylindrical portion, each of said positioning haunches being generally triangular members connected to said cylindrical portion and to the bottom of said support ring, each of said positioning haunches having a width less than the width of said support ring, so that the support ring when positioned on the upper edge of the leaching pool is automatically centered thereon.

2. A septic tank as claimed in claim 1 wherein each of said positioning haunches comprises a canted surface extending downwardly for centering said support ring on the upper wall edge of the leaching pool.

3. A septic tank as claimed in claim 1 wherein each of said inlet and outlet baffles is of L-shape with a U-shaped cross-section, and said cylindrical portion further comprising a hood-shaped reinforcing element defining a passage which is in communication with said outlet baffle, said reinforcing element being formed monolithically with said cylindrical portion and said ring including a first end connected to said cylindrical portion spaced above said open top end of said outlet baffle, and a second end connected to said support ring below said open top end, said support ring having an opening formed therein for cooperation with said reinforcing element so that said reinforcing element and said opening in said support ring form said passage and direct treated liquid sewage from said chamber to the leaching pool.

4. A septic tank as claimed in claim 1 wherein said cover further comprises a manhole formed in the center thereof, and a removable cover member for covering said manhole, said cylindrical portion having a central opening formed in the base thereof in vertical alignment with said manhole, and a cover means for obturating said central opening in said base, whereby inspection and viewing of said chamber and the interior of the leaching pool may be carried out.

5. A septic tank as claimed in claim 1 wherein said opening for mounting said outlet baffle is positioned lower on the circumference of said cylindrical portion relative to the upper edge thereof than said opening for mounting said inlet baffle, whereby a portion of said chamber above the liquid level defined by said opening for said outlet baffle is provided for the escape of gases from the sewage.

6. A septic tank as claimed in claim 1 in combination with a leaching pool, said leaching pool having a cylindrical portion with an upper wall edge, said upper wall edge supporting thereon said support ring, whereby a portion of said septic tank is positioned above said leaching pool.

7. Apparatus comprising a cistern having a transverse cross-section, a septic tank superposed on said cistern and being of smaller cross-section than and extending downwardly into said cistern and defining an annular space therewith, support means extending outwardly on said septic tank and limiting penetration of the septic tank into said cistern, said septic tank and support means having respective openings for the flow of liquid from the tank into said cistern, a downwardly open hood on the septic tank confining a passageway between the openings for the flow of said liquid via said annular space into said cistern, said septic tank being provided with an inlet opening, said apparatus further comprising baffles hanging from said openings in the interior of said septic tank, said baffles limiting access relative to the inlet and outlet openings and defining passages axially aligned in said septic tank, said support means being an annular ring, said ring, septic tank and hood being a monolithic structure of concrete, and centering means on said ring to center the septic tank on said cistern.

* * * * *